United States Patent [19]

Colby

[11] Patent Number: 5,018,917
[45] Date of Patent: May 28, 1991

[54] APPARATUS FOR GROOVING THE BARREL OF A PLASTICATING MACHINE

[75] Inventor: Paul N. Colby, New Castle, Pa.

[73] Assignee: Spirex Corporation, Youngstown, Ohio

[21] Appl. No.: 522,690

[22] Filed: May 14, 1990

Related U.S. Application Data

[62] Division of Ser. No. 418,238, Oct. 6, 1989, Pat. No. 4,953,279.

[51] Int. Cl.[5] .......................... B23P 6/00; B23D 1/08
[52] U.S. Cl. ................................ 409/296; 409/307; 409/327
[58] Field of Search ............... 409/296, 304, 307, 327, 409/329; 51/58, 290

[56] References Cited

U.S. PATENT DOCUMENTS

| | | |
|---|---|---|
| 390,306 | 10/1888 | Morton . |
| 404,679 | 6/1889 | Broomell ............................ 409/307 |
| 412,023 | 10/1889 | Dill . |
| 468,072 | 2/1892 | Morton . |
| 958,081 | 5/1910 | Billing ................................ 409/307 |
| 2,195,055 | 3/1940 | Wallace .............................. 51/278 |
| 2,445,934 | 7/1948 | Bodine, Jr. ......................... 51/31 |
| 2,765,529 | 10/1956 | Bolender ........................... 29/558 |
| 2,909,967 | 10/1959 | Ranous . |
| 3,466,972 | 9/1969 | Strait . |
| 4,778,316 | 10/1988 | Strait ................................. 409/177 |

FOREIGN PATENT DOCUMENTS 252566 12/1987 German Democratic Rep. .
627114 12/1981 Switzerland .

Primary Examiner—Daniel W. Howell
Attorney, Agent, or Firm—Buchanan Ingersoll; Alvin E. Ring

[57] ABSTRACT

A method and apparatus for cutting grooves onto the interior surface of the barrel of a plasticating machine in order to increase the friction against sliding unmelted resin particles. The helical screw is removed from the barrel without removing the barrel from its operating site. A grooving device is transported from a remote location to the plasticating operation site and mounted within the barrel with a portion protruding from the barrel. A brace is attached to the end of the barrel to help support the grooving device. Periodic adjustments are made to the grooving device by manual or automatic manipulation of the grooving device.

5 Claims, 4 Drawing Sheets

APPARATUS FOR GROOVING THE BARREL OF A PLASTICATING MACHINE

This application is a division, of U.S. application Ser. No. 418,238, filed Oct. 6, 1989, now U.S. Pat No. 4,953,279.

This invention relates to a method and apparatus for machining grooves on the interior surface of the barrel of a plasticating extruder machine, injection machine or blow molding machine.

In these plasticating machines, a screw rotatable within a barrel forces heated resinous material from the inlet end of the barrel to a mold at the outlet end of the barrel. The plasticating machine receives polymer pellets or powder of various particle shapes at the inlet end, heats and works the polymer sufficiently to convert it to a melted or plastic state and delivers the melted polymer under pressure through a restricted outlet or die. It is desirable that within the barrel the extrudate be fully melted and homogeneously mixed and uniform in temperature and viscosity.

In the plasticating machine, the barrel is an elongated cylinder which may be heated at various locations along its length and the screw extends coaxially through the barrel. The screw has a core with a helical flight which cooperates with the cylindrical surface of the barrel to define a helical valley for passage of the resin to the extruder outlet opening or injection front chamber.

At the inlet of the machine, the resin is unmelted. Generally, all surfaces over which the unmelted resin passes are smooth, and this smoothness can cause slippage of the resin particles with respect to the inside surface of the barrel. It has been known that this slippage can be corrected by imparting roughness to the inner surface of the barrel. The increase in friction due to the roughness will tend to reduce the slippage of the resin particles with respect to the inside of the barrel and will induce a more positive forward conveying action.

In the past, roughness was imparted to the interior surface of a plasticating machine barrel by removing the screw from the barrel and dismantling the heaters and heater shrouds and other fixating equipment and then transporting the barrel to a remote shop for machining grooves into the interior surface of the barrel. This machine operation required operating downtimes of the plasticating machine extending for weeks or months.

In accordance with this invention, the interior surface of a plasticating machine is grooved by transporting a grooving device from a remote location to the plasticating extrusion operating site, rather than vice versa. This saves dismantling time at the plasticating machine because the heaters, shrouds, supports, and barrel, etc., need not be removed. This also saves shipping costs because the grooving device is generally considerably lighter in weight than the barrel. When the grooving device reaches the extrusion site, the screw is removed from the interior of the barrel and the barrel interior can then be cleaned. The barrel can remain installed on the extruder or injection machine and retain the operational mooring or support used during the plasticating operation and that support can then be used in turn to also support the barrel with the grooving device. Thereby, no additional support need be erected for the grooving device but the plasticating barrel itself or an extension from the barrel can provide support for the grooving device. In this arrangement, the interior surface of the barrel can be grooved and the extruder or injection machine returned to operation with a downtime of no more than about a day or even only half of a day, as contrasted to downtimes of weeks or months when the barrel is transported to a grooving device at a remote shop where custom grooving is performed.

The invention will be more completely understood by reference to the accompany drawings in which FIG. 1 is a plan view showing the general operational positioning of a plasticating injection machine;

Figure 4A:
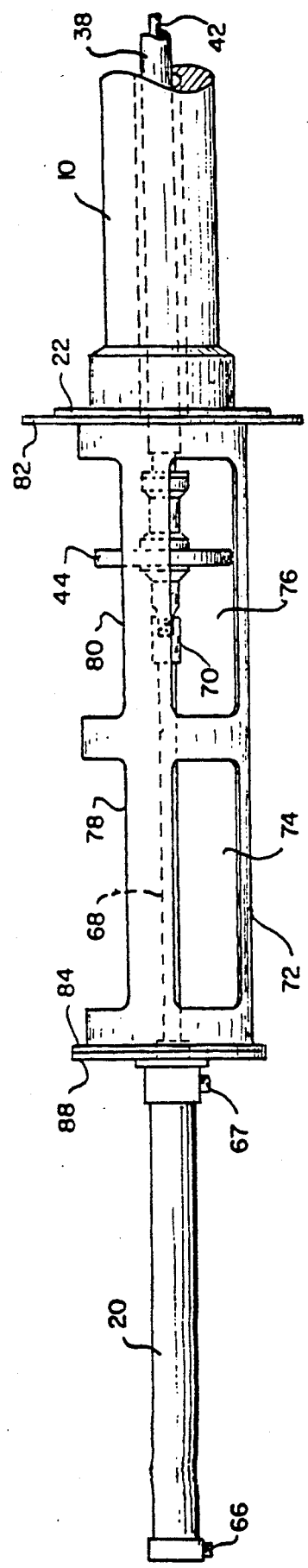
Figure 4B:
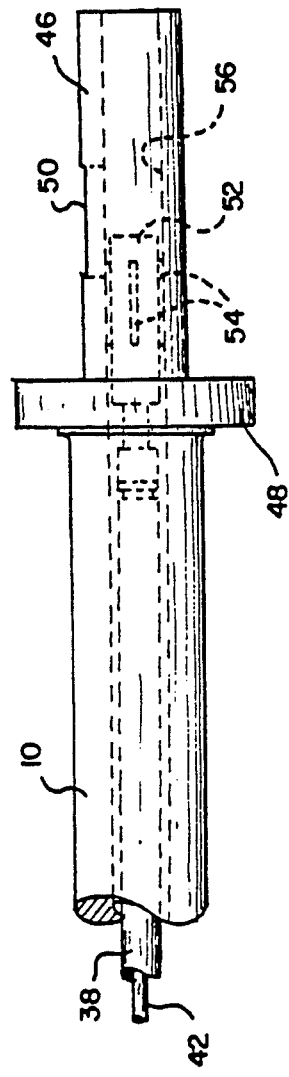
Figure 5:
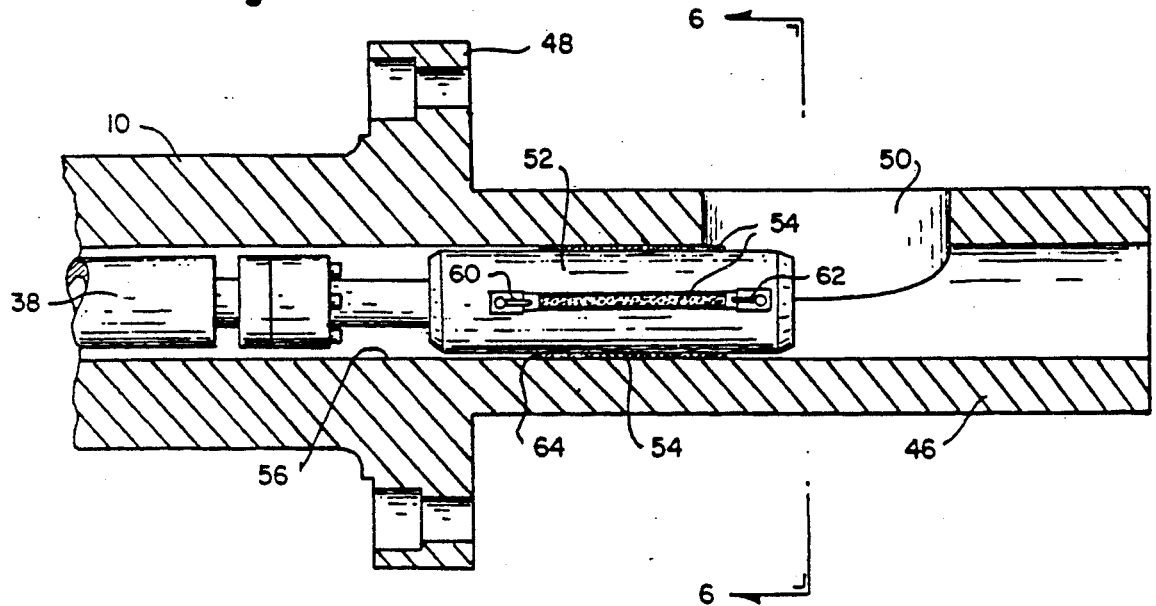
Figure 6:
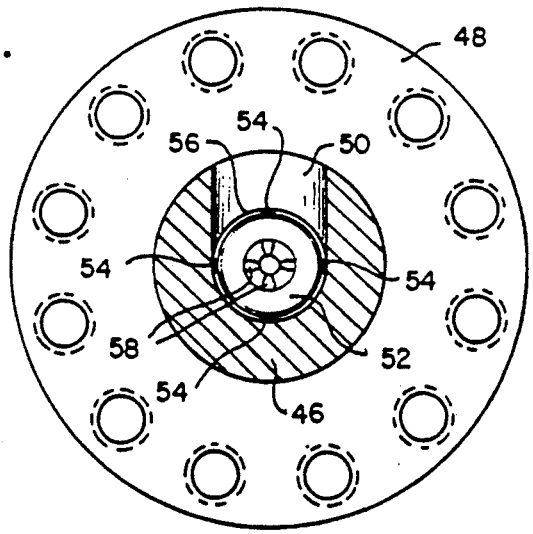
Figure 7:
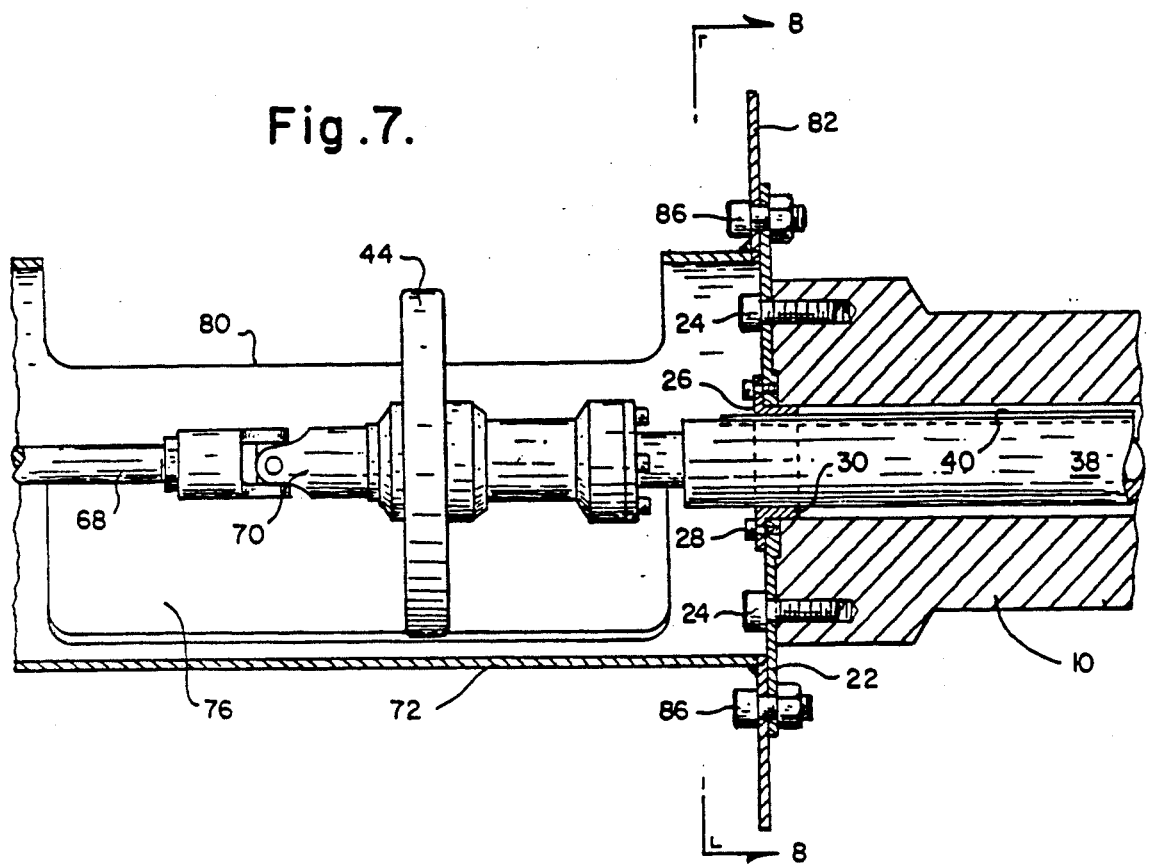
Figure 8:
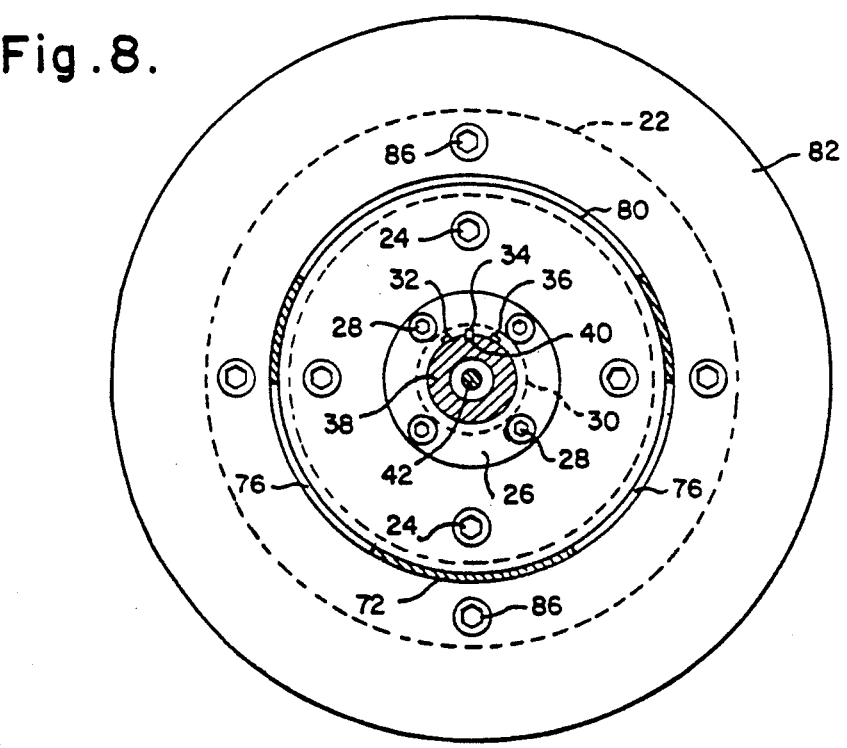

FIGS. 4A and 4B present a side view of a grooving device-extruder barrel combination, broken into two longitudinal fragments;

FIG. 5 is an exposed view of a honing head operatively positioned in an extruder barrel;

FIG. 6 is a view through the section 6—6 of FIG. 5;

FIG. 7 is a longitudinal sectional view showing the attachment of the grooving device to the extruder barrel;

FIG. 8 is a view through the section 8—8 of FIG. 7; and

Figure 9:
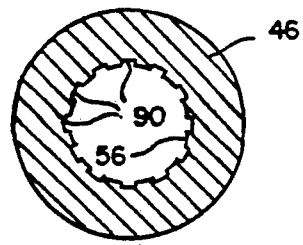

FIG. 9 is a cross-sectional view of a grooved interior of an extruder barrel.

Figure 1:
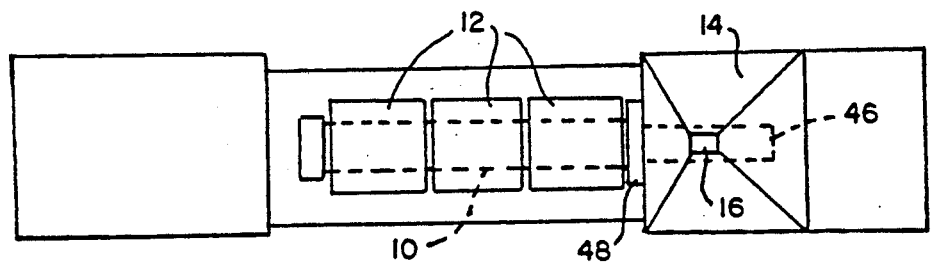

FIG. 1 schematically shows plasticating injection barrel 10 positioned at the plasticating operational site and surrounded by heater elements schematically indicated at 12. A rotating screw, not shown, is disposed within barrel 10 to convey plastic through barrel 10. Hopper means 14 is provided for feeding plastic pellets or powder to inlet port 16 of barrel 10, shown in FIG. 2. Driving means not shown, for rotating the screw is located at the feed end of barrel 10.

Figure 2:
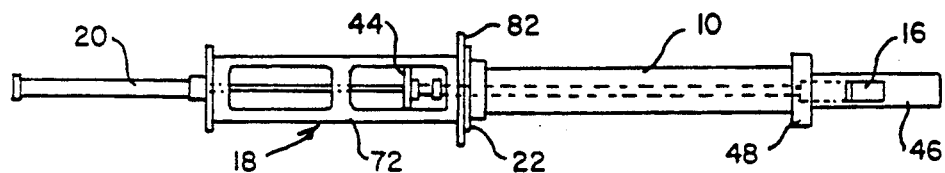
FIG. 2 is a plan view of a plasticating extruder cylinder in combination with a portable grooving device, with the extruder cylinder remaining in its operational position.

FIG. 2 generally indicates a grooving device 18 having reciprocating motive means 20, such as a hydraulic reciprocating piston. Grooving device 18 is secured to adapter 22 on the discharge end of extruder barrel 10, by means more clearly illustrated in FIGS. 7 and 8. FIGS. 7 and 8 show adapter 22 is secured to barrel 10 by a plurality of bolts 24. Bushing 26 is secured to adapter 22 by means of a plurality of bolts 28. Bushing 26 has an inturned collar portion 30 having a plurality of circumferentially spaced interior slots 32, 34 and 36 shown in FIG. 8. As shown in FIGS. 7 and 8, longitudinal guide tube 38 has a longitudinally extending key 40 to be received in any one of slots 32, 34 or 36, which is shown keyed into slot 34 in FIGS. 7 and 8.

Referring now to FIGS. 4A and 4B, longitudinal guide tube 38 which extends coaxially within barrel 10 encloses an elongated interior coaxial rod 42. Guide tube 38 is subjected to longitudinal reciprocating motion by piston in cylinder motive means 20. Rod 42 is longitudinally movable independently of guide tube 38. Manual rotation of handwheel 44 actuates a convenentional thread mechanism to longitudinally extend or retract rod 42.

FIGS. 5 and 6 illustrate the mechanism actuated by rod 42. FIG. 5 shows barrel rim 48 with bolt openings for the attachment of a feed block, not shown, and rear portion 46 of barrel 10 which has overhead feed opening 50 for the admission of plastic pellets or powder from said feed hopper during operation of the extruder. The helical screw has been replaced by a grooving device in the figures The grooving device has cutting head 52 at its forward end. The outside surface of cutting head 52 is provided with a plurality of elongated stone cutters 54. Stone cutters 54 can be radially extended or retracted relative to the surface of honing head 52 by rotation of handwheel 44 and longitudinal movement of rod 42, as explained below. When stone cutters 54 are in the retracted position, they can be below or flush with the surface of head 52. When stone cutters 54 are in the extended position they extend outwardly from the surface of cutting head 52 and are urged against inner surface 56 of front portion 46 of barrel 10.

Referring to FIG. 6, each stone 54 is cam loaded from beneath by means of a cam, not shown, with each cam held in place by means of a floating peg 58 located between its associated cam and longitudinal rod 42. Rod 42 can have a longitudinally inclined surface or longitudinal taper, not shown, so that when rod 42 is thrust forward by rotation of handwheel 44 its forward motion is transferred into radial movement pushing pegs 58 outwardly which in turn moves a cam associated with each peg 58 which in turn urges cutting stones 54 radially outwardly into an extended position and against inner surface 56 of barrel extension 46. When rod 42 is returned to a retracted position by reverse rotation of wheel 44, the force of the cam is released and a pair of spring loaded clips 60 and 62, shown in FIG. 5, urges each cutting stone 54 to return to a retracted position with respect to the exterior surface of honing head 52.

FIG. 5 shows honing or cutting head 52 in almost its most extended practical position at which edge 64 of cutting stone 54 has not reached feed opening 50. Actually, cutting head 52 can extend further to a position whereat one-half of stone 54 is within the zone of feed opening 50.

FIGS. 4A and 4B and FIG. 7 illustrate the attachment of reciprocating motive means 20 to the already described structure. Reciprocating motive means 20 can comprise a hydraulic piston, not shown, to which hydraulic oil is supplied through tube 66 from a source not shown. Oil of reduced pressure can be exhausted through tube 67. For reverse movement of motive means 20, the oil path is reversed The hydraulic piston is provided with piston extension rod 68 having universal joint 70 at its forward end. Pipe brace 72 has a plurality of side cutout windows 74, 76, 78 and 80 to reduce weight and to provide manual access to its interior and is equipped with forward and rear flanges 82 and 84, respectively. Forward flange 82 is secured to adapter 22 on extruder barrel 10 by means of bolts 86, shown in FIG. 7. Rearward flange 84 is secured to a forward adapter 88 of reciprocating motive means 20. Thereby, the entire grooving device forward of (to the right of) universal joint 70 can be preassembled and inserted into extruder barrel 10 so that the longitudinal and angular position of the grooving device becomes fixed within the barrel.

The inserted portion of the grooving device will be supported and centered by collar 30 of bushing 26 with key 40 mated into any one of slots 32, 34 or 36. Then, tube 72 can be mounted onto barrel 10 by bolting forward flange 82 to adapter 22. Finally, reciprocating motive means 20 is mounted on the assembly by inserting reciprocating rod 68 into the open rearward end of pipe brace 72 to complete the universal joint and securing forward adapter 88 to rearward flange 84. Thereby, open pipe 72 serves as a supporting brace for the rearwardly protruding portion of the grooving device. Open windows 74, 76, 78 and 80 in pipe brace 72 in addition to reducing weight allow manual access to the interior of pipe brace 72 to secure the opposite portions of universal joint 70 to each other.

Open windows 74, 76, 78 and 80 also permit access to accomplish at periodic intervals manual grasping of the grooving device in order to turn wheel 44 to radially force cutting stones 54 against barrel surface 56 followed by actuating reciprocating means 20 to hone grooves into interior barrel surface 56. Then, the reciprocating means is turned off and wheel 44 is turned in the opposite direction to retract stones 54 from barrel surface 56. The grooving device is again manually manipulated through the windows, or otherwise, to withdraw longitudinal key 40 from its particular slot 32, 34 or 36 and to return key 40 to another of the slots, so that the circumferential position of cutting heads 54 is changed. Then, wheel 44 is again turned to again urge cutting heads 54 against barrel interior surface 56. Thereby, there is a sequential series of steps following each reciprocating cutting operation including manual retracting of cutting stones 54 and rekeying of the grooving device into a different particular slot 32, 34 or 36, followed by again urging cutting stones 54 against the interior surface 56 of the extrusion barrel. Thereupon, reciprocating motive means 20 is again actuated to hydraulically reciprocate the entire grooving device, so that stones 54 cut another set of grooves into the interior surface of barrel extension 46.

Some of the above steps can be performed automatically, rather than manually For example, stones 54 can be automatically extended and retracted relative to barrel surface 56, rather than manually. If stones 54 are extended and retracted automatically, the extension and retraction can occur without turning off the reciprocating means.

The above sequence of steps is repeated after each set of grooves is cut so that the device is eventually operated with key 40 in each one of circumferentially spaced slots 32, 34 and 36, respectively. In the apparatus shown, there are four equally spaced cutting heads 54 and three equally spaced circumferential slots 32, 34 and 36 so that, as shown in FIG. 9, at the end of the grooving operation there will be twelve equally spaced parallel grooves 90 cut into the interior surface 56 of barrel extension 46. It will be appreciated that a different spacing of the slots or a different number of slots or cutting heads will provide a different number and spacing of grooves 90. After the above sequence is repeated three times, one time for each slot, the cutting heads are finally retracted and the grooving device is removed from the barrel. The screw can then be returned to the barrel and the barrel can be returned to its plasticating operation without shipping it to another location and with no resetting of its support moorings.

It is a feature of this invention that the grooving device is light in weight so that it can be manually carried to the site of operation of the extruder, in contrast to the extruder being transported to the site of the grooving device. The extruder barrel is generally of much heavier weight than the grooving device so that transport of the barrel to a remote shop would be more difficult and costly than transport of the grooving device to the site of plasticating operation of the barrel.

Figure 3:
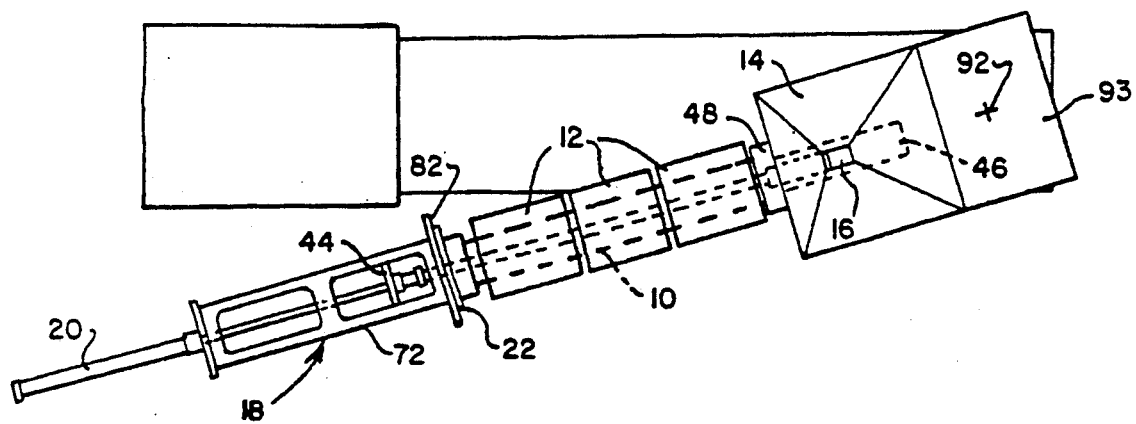
FIG. 3 is a plan view of an injection machine with a portable grooving device, with the extruder rotated about a swivel on one end at the injection machine to receive the grooving device.

FIG. 3 illustrates one means of adjusting the position of the plasticating machine at its operating site so that space will be provided to position the protruding portion of the grooving device including tube brace 72 and reciprocating motive means 20. As shown in FIG. 3, the plasticating machine is rotated in place about pivot point or swivel 92 on apron 93 so that the plasticating machine retains its operational support during the grooving operation. It is a further feature of the invention that brace 72 finds support by attachment to barrel 10, whereby the entire grooving device is supported upon the operational bearings of the plasticating extrusion apparatus.

I claim:

1. An apparatus for grooving the interior surface of a plasticating machine having a plasticating extruder barrel and having support moorings with said plasticating barrel supported by said support moorings during the plasticating operation, said apparatus comprising
   a. said plasticating extruder barrel supported by said support moorings,
   b. a grooving device within said barrel while said extruder barrel is supported by said moorings, said grooving device having cutting elements which are disposed near one end of said barrel for grooving the interior surface of said barrel,
   c. the end of said grooving device opposite from said cutting elements protruding from the other end of said barrel,
   d. reciprocating means mounted on the protruding end of said grooving device to impart reciprocating movement to said cutting elements,
   e. a support brace attached to said other end of said barrel for providing support for said protruding end of said grooving device,
   f. said support brace providing access to allow manual adjustment of said grooving device, and
   g. a bushing at said other end of said barrel for supporting said grooving device, said bushing having circumferentially spaced slots, and a key disposed on said grooving device for sequentially keying said grooving device into each of said slots.

2. The apparatus of claim 1 wherein said brace is tubular and has open windows, and a wheel manually accessible through said windows for periodically radially extending and then retracting said cutting elements.

3. An apparatus for grooving the interior surface of a plasticating machine having support moorings with said plasticating machine supported by said support moorings during the plasticating operation, said apparatus comprising
   a. said plasticating extruder barrel supported by said support moorings,
   b. a grooving device within said extruder barrel while said barrel remains supported by said moorings, said grooving device having cutting elements which are disposed near one end of said barrel for grooving the interior surface of said barrel,
   c. the end of said grooving device opposite from said cutting elements protruding from the other end of said barrel,
   d. reciprocating means mounted on the protruding end of said grooving device to impart reciprocating movement to said cutting elements,
   e. a bushing having circumferentially spaced slots at said other end of said barrel for supporting said grooving device, and
   f. a key disposed on said grooving device for sequentially keying the grooving device into each of said slots.

4. An apparatus for grooving the interior surface of a plasticating machine having a plasticating extruder barrel and having support moorings with said plasticating barrel supported by said support moorings during the plasticating operation, said apparatus comprising
   a. said plasticating extruder barrel supported by said support moorings,
   b. a grooving device within said extruder barrel while said barrel remains supported by said moorings, said grooving device having a longitudinal rod and cutting elements for grooving the interior surface of said barrel,
   c. said cutting elements disposed near one end of said barrel,
   d. said cutting elements radially extendable and retractable with respect to the rod,
   e. the end of said grooving device opposite from said cutting elements protruding from the other end of said barrel, and
   f. reciprocating means mounted at the protruding end of said grooving device to impart reciprocating movement to said cutting elements.

5. The apparatus of claim 4 including
   g. a support brace attached to said other end of said barrel providing support for the protruding end of said grooving device.

* * * * *